(12) United States Patent
Dong et al.

(10) Patent No.: US 11,740,699 B2
(45) Date of Patent: Aug. 29, 2023

(54) TACTILE FEEDBACK GLOVE

(71) Applicants: Angelina Dong, Dallas, TX (US);
Christina Dong, Dallas, TX (US);
Tarini Gupta, Dallas, TX (US)

(72) Inventors: Angelina Dong, Dallas, TX (US);
Christina Dong, Dallas, TX (US);
Tarini Gupta, Dallas, TX (US)

( * ) Notice: Subject to any disclaimer, the term of this patent is extended or adjusted under 35 U.S.C. 154(b) by 383 days.

(21) Appl. No.: 16/899,186

(22) Filed: Jun. 11, 2020

(65) Prior Publication Data

US 2021/0386145 A1    Dec. 16, 2021

(51) Int. Cl.
*G06F 3/01*    (2006.01)

(52) U.S. Cl.
CPC .............. *G06F 3/016* (2013.01); *G06F 3/014* (2013.01)

(58) Field of Classification Search
CPC .................................. G06F 3/016; G06F 3/014
See application file for complete search history.

(56) References Cited

U.S. PATENT DOCUMENTS

| | | | | |
|---|---|---|---|---|
| 9,104,271 B1* | 8/2015 | Adams | ..................... | G06F 3/014 |
| 10,642,356 B1* | 5/2020 | Wang | ..................... | G06F 3/014 |
| 2003/0223844 A1* | 12/2003 | Schiele | .................. | A63B 23/12 |
| | | | | 414/5 |
| 2008/0284289 A1* | 11/2008 | Fisher | ..................... | B25J 21/02 |
| | | | | 312/1 |
| 2015/0317910 A1* | 11/2015 | Daniels | .................... | G09B 9/00 |
| | | | | 434/257 |
| 2017/0168565 A1* | 6/2017 | Cohen | .................. | A61B 5/0022 |
| 2019/0101981 A1* | 4/2019 | Elias | ........................ | G09B 5/02 |
| 2020/0375287 A1* | 12/2020 | Ben-Tzvi | ................ | G06F 3/014 |
| 2021/0128022 A1* | 5/2021 | Hall | ..................... | A61B 5/0022 |

* cited by examiner

*Primary Examiner* — Jonathan A Boyd
(74) *Attorney, Agent, or Firm* — Frost Brown Todd LLP

(57) ABSTRACT

A tactile feedback glove for use in an extravehicular activity (EVA) environment by an astronaut is described. The tactile feedback glove is formed by a glove having an outer layer, a second layer and inner bladder, wherein the inner bladder encloses a gas environment suitable for an astronaut's hand. A force sensor is attached to a fingertip of each finger of the glove on an inner surface of the outer layer to sense the pressure applied at the associated fingertip. A haptic feedback device is attached to the fingertip of each finger of the glove on an outer surface of the inner bladder. Each haptic feedback device is adjacent to each associated force sensor and positioned to provide tactile feedback for the associated finger. A visual feedback device is also attached to an outer surface of the outer layer of the glove in a visual field of the astronaut. A controller receives a signal from each force sensor indicative of the force applied by the wearer at the associated fingertip, and sends a feedback signal to drive each haptic feedback device and the visual feedback device to provide tactile and visual feedback to the wearer when the signal from one of the force sensors meets preprogrammed levels.

20 Claims, 11 Drawing Sheets

TACTILE FEEDBACK GLOVE

TECHNICAL FIELD

The present disclosure is directed to sensory feedback systems and more particularly to gloves that provide feedback to the user on the pressure being applied at the fingertips that are adapted to be used by astronauts while working outside of the spacecraft.

BACKGROUND OF THE INVENTION

Referring now to FIGS. 1A and 1B, a current embodiment of an extravehicular activity (EVA) glove system is shown, which is used by astronauts when exposed to the vacuum of space. Glove system 108 includes glove 100 which attaches to a lower arm assembly 111 using a set of locking rings 113 in the glove which mate to a receptacle 114 in the lower arm assembly 111. A strap/cable 112 also links the glove 100 to the lower arm assembly 111. The strap 112 can include electrical connections that can provide power to the glove and carry signals to and from the glove from electronics in the spacesuit. Glove 100 generally consists of hand section 101, wrist section 102, and finger sections 103 and thumb section 105. Hand section 101 can include a palm plate 106, while finger sections 103 include tip sections 104. A similar thumb tip section is also included on thumb section 105. The palm plate 106 and fingertip sections 105 can be reinforced against wear since those sections are the main contact points for glove 100.

Currently, astronaut gloves are excessively thick and bulky with several layers (see, FIG. 3, below). The glove consists of a pressurized "bladder" layer to create the right environment for human hands, a restraint layer to hold the bladder in place and provide extra insulation, and a thermal micro-meteoroid garment which is bullet-proof, waterproof, and fire resistant. These layers restrict most hand movement and decrease the hands' fine motor skills, range of motion and ability to sense pressure. When astronauts work outside of the spacecraft, they must wear these thick and bulky gloves. The layers of astronaut gloves render the astronaut unable to feel the amount of force they exert while pressing down on an object or surface. If they press with a force greater than twenty Megapascals, the tensile force may be enough to cause fingernail trauma or otherwise damage astronaut's hands.

There has been much done already to improve the overall comfort of EVA gloves. Not much about the design of astronaut gloves was recorded before the development of the 4000 series gloves. Introduced in 1985 as an improved version of the previous 3000 series, it laid down the fundamental design followed by subsequent models. The Phase IV EVA glove refined the bladder and restraint layer, improving finger dexterity and flexibility of the joints. Specifically, palm plate segmentation allowed for more movement and flexibility in that specific area. During the development of the 5000 series and Phase V gloves, new technologies became readily accessible for use in the design process. Technologies such as Laser Scanning and CAD software greatly increased the reproducibility of the glove. Lastly, modifications in the overall design and materials in the Phase VI glove, such as the use of soft, lightweight polyester fabric, improved fingertip dexterity and overall comfort. However, none of these modifications address the aforementioned problem, and instead focused on changing the materials in the glove to improve mobility and comfort.

Thus, gloves with the ability to provide tactile feedback to the wearer using force sensors to solve the aforementioned problem are desired.

BRIEF SUMMARY OF THE INVENTION

In a preferred embodiment, a tactile feedback glove for use in an extravehicular activity (EVA) environment by an astronaut includes a glove having an outer layer, a second layer and inner bladder, wherein the inner bladder encloses a gas environment suitable for an astronaut's hand. A force sensor is attached to a fingertip of each finger of the glove on an inner surface of the outer layer to sense the pressure applied at the associated fingertip. A haptic feedback device is attached to the fingertip of each finger of the glove on an outer surface of the inner bladder. Each haptic feedback device is adjacent to each associated force sensor and positioned to provide tactile feedback for the associated finger. A visual feedback device is also attached to an outer surface of the outer layer of the glove in a visual field of the astronaut. A controller receives a signal from each force sensor indicative of the force applied by the wearer at the associated fingertip, and sends a feedback signal to drive each haptic feedback device and the visual feedback device to provide tactile and visual feedback to the wearer when the signal from one of the force sensors meets preprogrammed levels.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

In order to overcome the deficiencies of existing EVA gloves, the concepts described herein provide for a glove system that senses the pressure exerted by the astronaut at key points of the glove, particularly the fingertips but also possibly including the palm, other points along the fingers, the knuckles and other locations that may be relevant. The sensed force is then used to provide feedback to allow the astronaut to recognize the pressure being applied though they may not be able to feel it through the glove, or feel it sensitively enough to understand the pressure being applied. The feedback may be in one or more forms that include haptic feedback using small linear accelerators, visual feedback using light emitting diodes, or auditory feedback using a speaker in the helmet. Other types of feedback may also be employed without departing from the scope of the concepts herein.

Figure 1A:
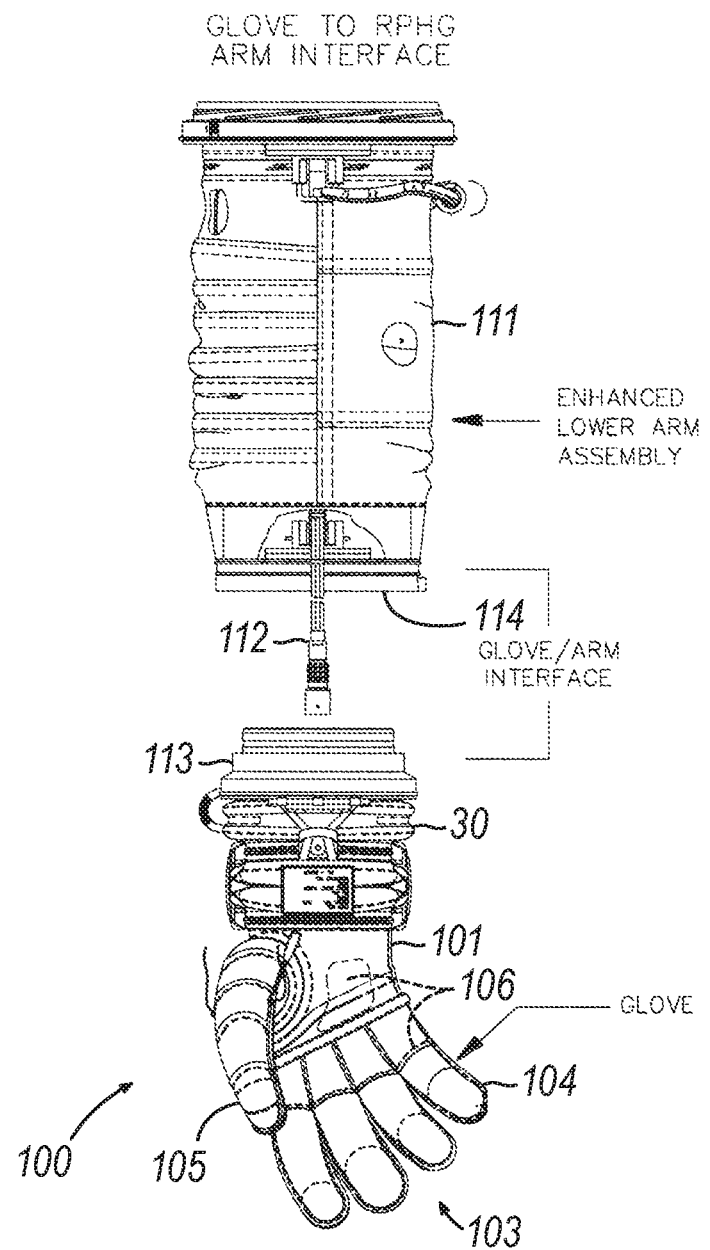
FIG. 1A is a perspective view of a prior art EVA glove system.
Figure 1B:
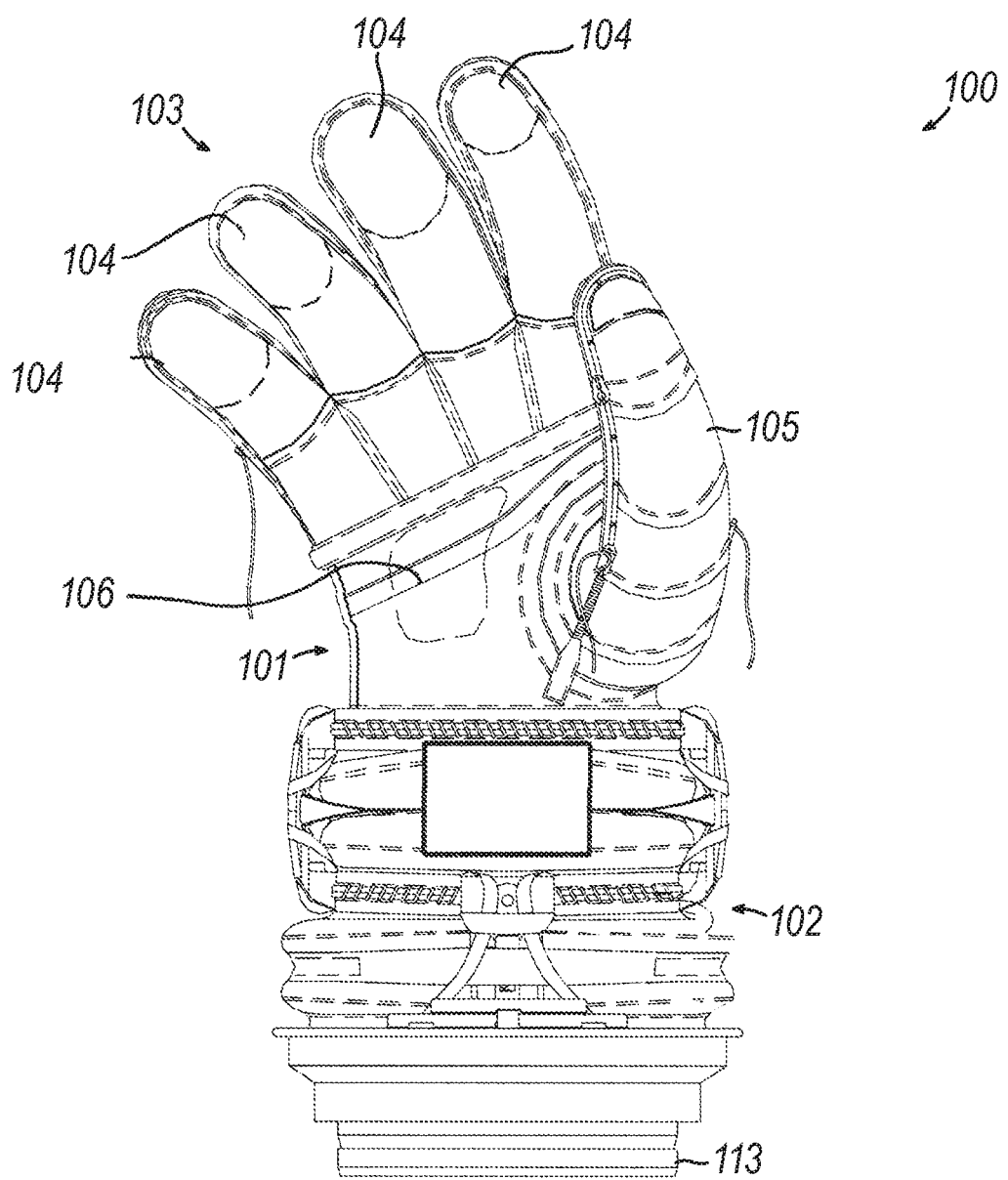
FIG. 1B is a perspective view of the glove of FIG. 1A.
Figure 2:
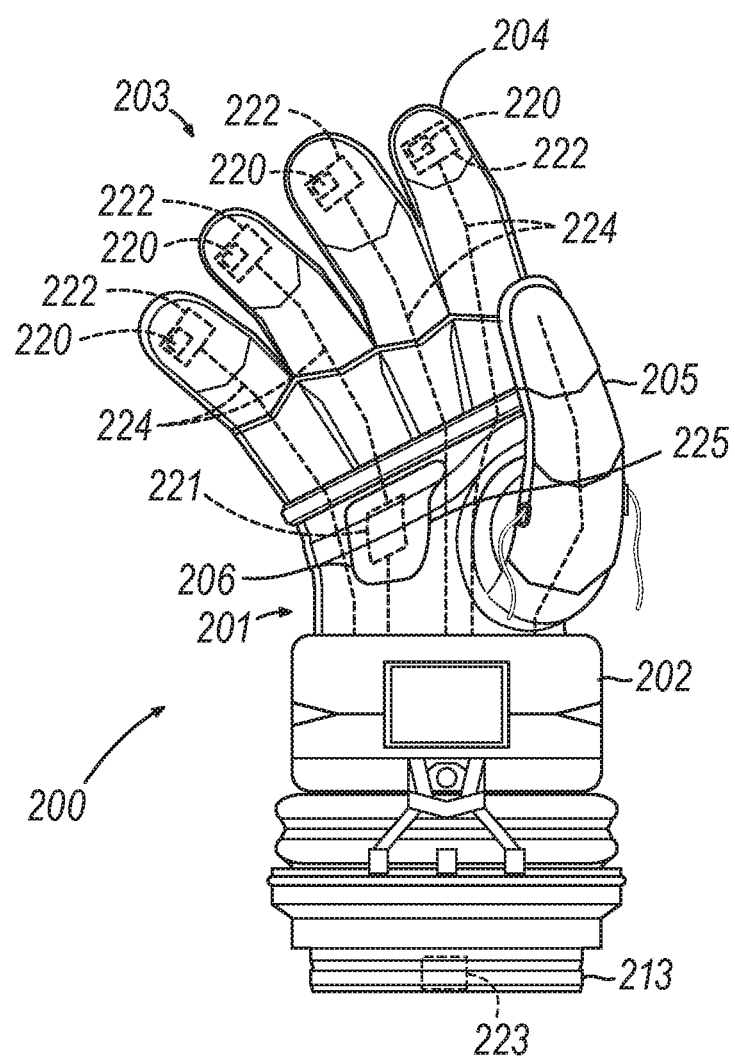
FIG. 2 is perspective view of an EVA glove system employing force sensors and haptic feedback according to the concepts described herein.

Referring now to FIG. 2, an embodiment of a glove system according to the present invention is shown. As before, glove 200 includes a hand section 201, wrist section 202 and fingers 203 and thumb 205. Glove 200 attaches to a lower arm assembly using attachment rings 213. Glove 200 embeds sensors 220 into each fingertip 204 and the tip of thumb 205. The sensors measure the force applied by the astronaut's fingertip and provides an electronic signal related to that force to a controller using wires 224. Haptic feedback device 222 may be located adjacent to sensor 220, preferably relatively closer to the astronaut's fingertip whereas the sensor is relatively closer to the outside surface of glove fingertip 204. Haptic feedback device 222 receives a signal from the controller that signals the astronaut based on the pressure sensed by the force sensor 220. The signal can be sent using wires 224 or other wires running through the glove. A palm sensor 221 may also be provided to sense pressure in the palm area of the glove and an associated haptic feedback device 225 can provide feedback in the palm of the astronaut. A connector 223 may be used to plug into a wiring harness on the lower arm assembly and also used to relay signals from the sensor to a controller and from the controller to the haptic devices.

The haptic feedback devices may be used in any way that provides tactile feedback to the astronaut, but in preferred embodiments the two types of feedback used are based on a preset threshold feedback or a proportional feedback. In the threshold feedback embodiment, a preset force is determined that once exceeded activates the haptic device 222 to signal the astronaut that too much force is being applied. In certain embodiments the threshold can be set to twenty megapascals, which has been determined to be the force at which damage, such as fingernail breaks and bruising can occur. In the threshold embodiment, the haptic device is either on, indicating acceptable force is being used, or off, indicating that excessive force is being employed.

In an alternate embodiment, proportional feedback can be used where the controller senses the force being applied and controls haptic device 222 to provide feedback to the astronaut proportional to the force sensed. In this embodiment, the haptic device would provide feedback proportional to the sensed force. The stronger the force sensed the stronger the haptic feedback. This would allow the astronaut to have a sense of the relative pressure being applied. The proportional feedback could also include a threshold so that the astronaut does not feel constant feedback, but instead begins to feel mild feedback above a certain threshold with the feedback becoming stronger as the pressure approaches undesired levels. For example, mild feedback could be applied at fifteen megapascals with the feedback growing stronger as the pressure increases and becoming uncomfortable above the undesirable pressure, such as twenty megapascals. In additional to continuous and/or threshold proportional feedback, the haptic sensor could also be used to provide step function feedback with increasingly rapid warning pulses as the pressure approaches a threshold and continuous feedback about a threshold. Any other method of providing tactile feedback to the astronaut about the pressure being applied at a pressure point is also well within the scope of the concepts described herein.

Figure 3:
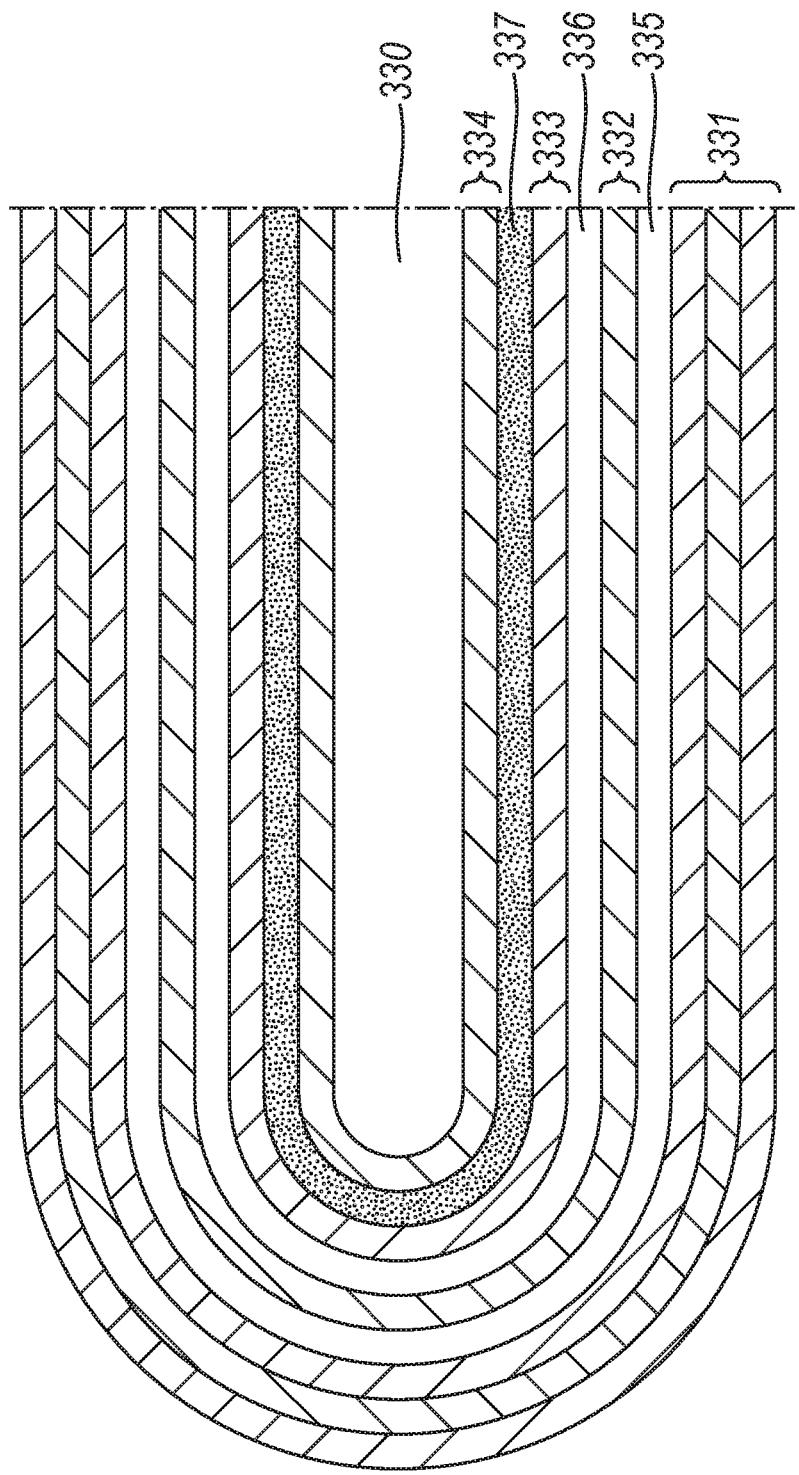
FIG. 3 is a cutaway side view of a prior art glove of FIG. 1A.

Referring now to FIG. 3, a cutaway of an exemplary finger from a prior art EVA glove is shown. The finger 304 of the glove is composed of many layers that provide the required protection for the astronaut. Outer layer 331 is composed of multiple layers to provide strength and durability to the glove. In existing gloves three layers are used that include Nomex chiffon, Dacron layers and Teflon fabric on the back of the finger. On the inside and tips of the finger, outer layer 331 uses Nomex felt as the innermost layer followed by Nomex fabric and then RTV as the outermost layer. The RTV layer provides greater durability, wear and grip. Inside of the outer layer 331, a second layer 332 is separated from outer layer 331 by gap 335, allowing outer layer 331 and second layer 332 to move relative to each other. Second layer 332 transitions from Dacron fabric on the inside of the finger to Kevlar and urethane at the tip and then back to Dacron fabric on the back of the finger.

Another gap 336 separates second layer 332 from bladder 333. Bladder 333 is composed of Rucothane and provides a gas impervious barrier to allow gas environment 337 to surround finger 330. A comfort glove 334 or glove liner is used to protect the finger 330 from contacting the bladder 333 and possibly blister or chaffing from prolonged contact with the Rucothane.

As can be seen from FIG. 3, the existing EVA gloves are comprised of 3 or more independent layers of various compositions and thickness, with additional gaps and gas layers between the layers of glove material. It is difficult or impossible for the astronaut to get any feedback through the glove about the amount of force that is being applied by the finger, palm or other contact area to an object or surface outside the glove.

Figure 4:
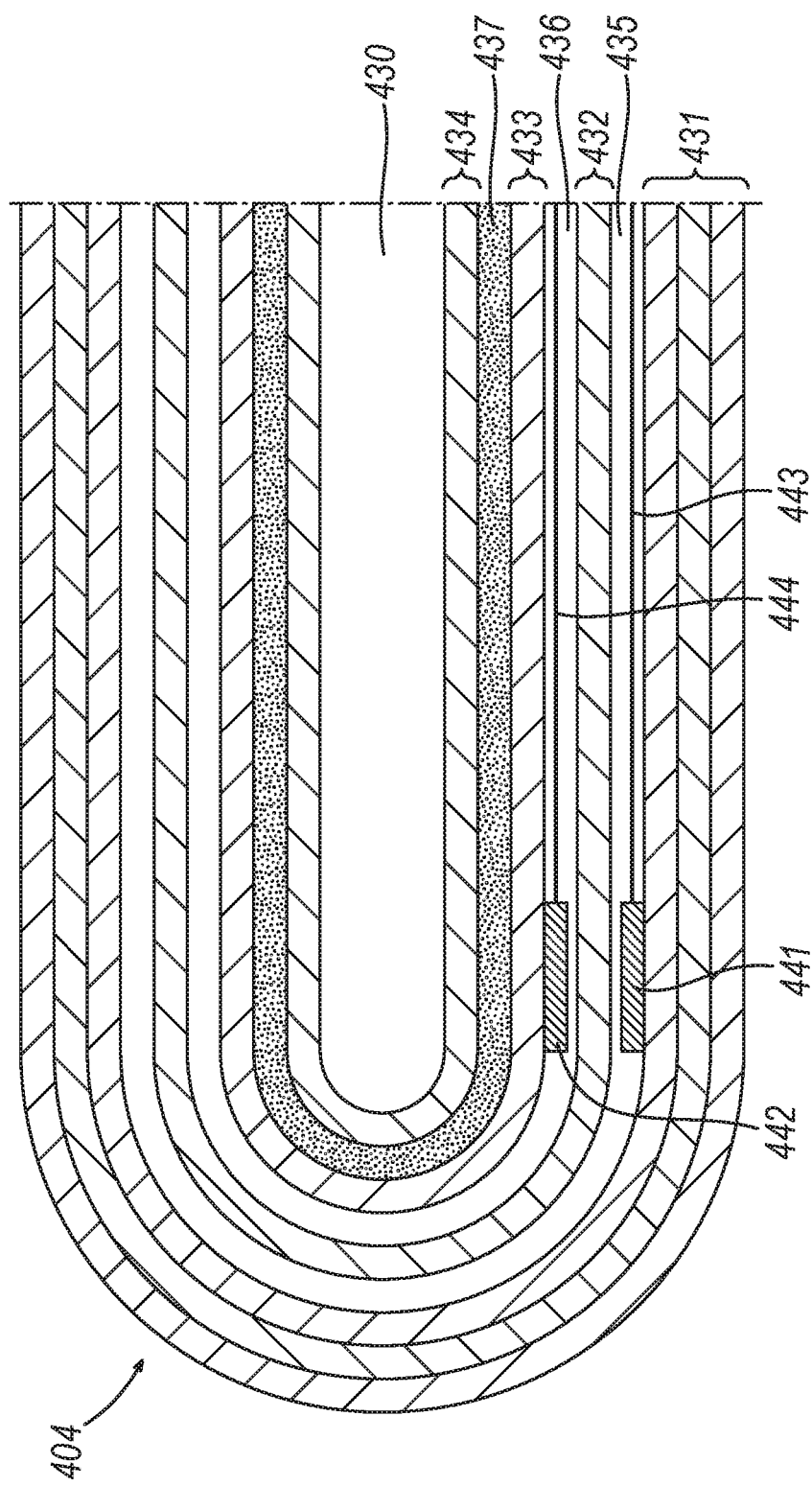
FIG. 4 is a cutaway side view of an embodiment of a glove system according to the concepts described herein.

Referring now to FIG. 4, an embodiment of a glove system according to the concepts described herein is shown that uses force sensors and haptic feedback to give the astronaut a sense of how much force they are applying. The structure of the glove finger 404 remains the same as the existing glove 304 from FIG. 3. Outer layer 431 is separated from second layer 432 by gap 435. Second layer 432 is separated from bladder 433 by gap 436. Bladder 433 holds gas environment 437, which surrounds finger 430 protected by comfort layer/liner 434.

Incorporated in between the various layers, embodiments of the present invention place a force sensor 441 and a haptic feedback device 442. Wires 443 and 444 are run between the layers and are attached to or embedded in the adjacent fabric. Wires 443 and 444 are used to carry electronic signals to and from the devices and to power the devices, as necessary. In preferred embodiments the force sensor 441 is attached to or embedded in the inside of the outer layer 431. Positioning the force sensor 441 on the inside of the outer layer 431 gives the force sensor the ability to most accurately measure the force being applied to the outer surface of the glove. Force sensor 441 preferably sends a signal that is proportional to the force applied by the sensor. The signal could be a change in the electrical resistance, voltage or current at the force sensor proportional to the force sensed.

Haptic feedback device 442 is preferably attached to or embedded in the outer surface of bladder 433. The bladder 433 and comfort glove 434 should not overly attenuate the tactile feedback from the haptic device, thereby allowing the astronaut to feel the feedback from the sensor. Wire or wires 444 may be used to provide the signal to the haptic device 443 and any power required to operate the device. While preferred locations for the sensor and haptic device are shown, the sensor and haptic device could be placed at other locations in the glove structure without departing from the scope of the concepts described herein so long as the force sensor can detect an approximation of the force being applied by the glove and the astronaut can feel the feedback provided by the haptic device. Additionally, conductive thread may be used to embed the various sensors and tactile feedback devices into the glove.

While preferred embodiments use a haptic device to provide feedback to the astronaut, other types of feedback may be given to the astronaut in addition to or instead of the haptic feedback. While any type of feedback is within the scope of the concepts described herein, certain embodiments can use visual and/or auditory feedback. Visual feedback can be provided to the astronaut by placing lights, such as LEDs, within the field of view of the astronaut. For example, lights can be incorporated into the back of the glove or into the astronaut's helmet that light when a threshold force has been exceeded. Brightness or arrays of multiple lights can be used to indicate the relative value of the force sensed. Auditory feedback can be given using the speaker in the astronaut's helmet using chirps, tones or even pre-recorded messages to warn the astronaut.

Figure 5:
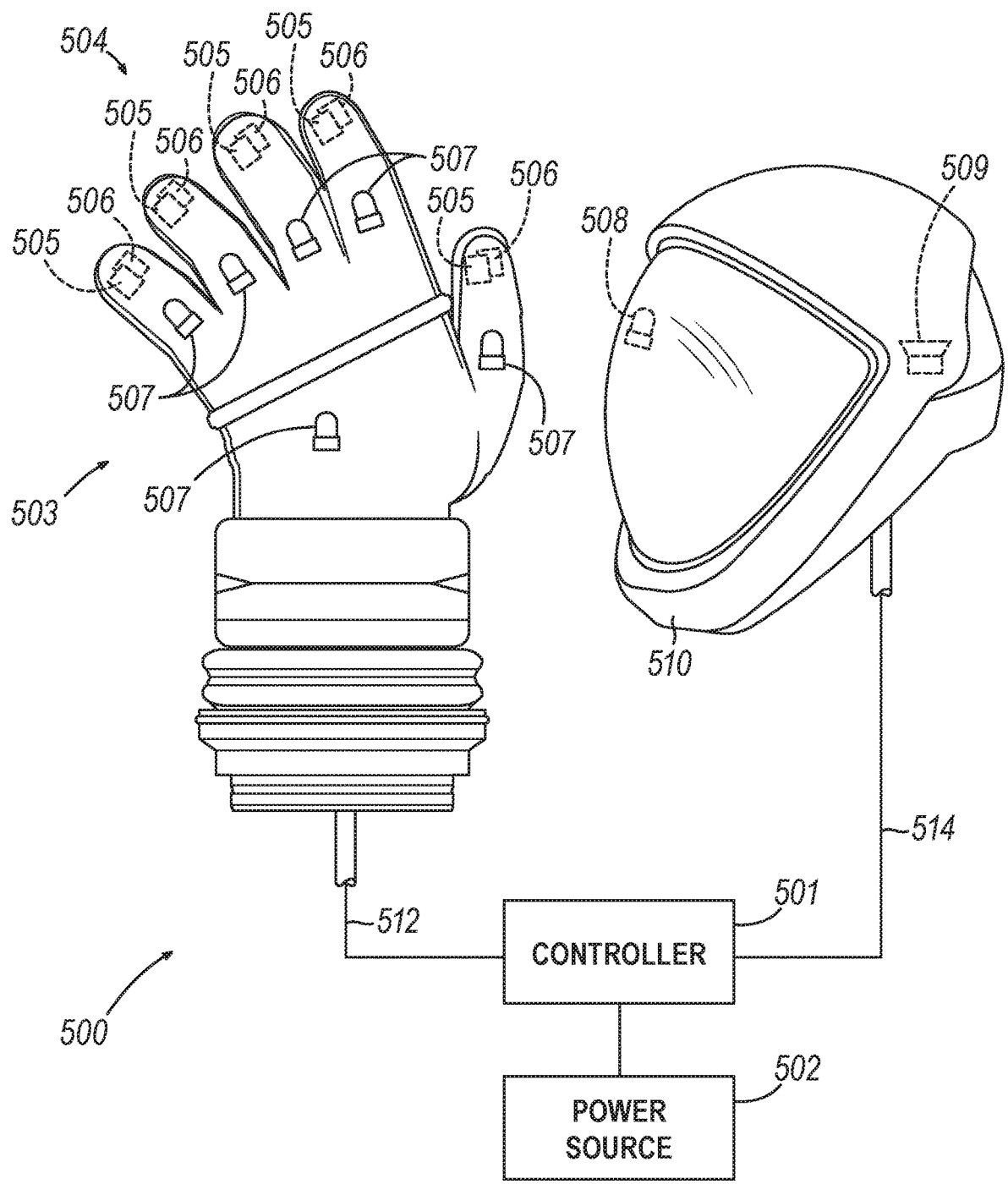
FIG. 5 is a block diagram of the electrical components of a glove system according to the concepts described herein.

Referring now to FIG. 5, a preferred embodiment of the electrical components of the glove system according to the present invention are shown. Glove system 500 uses programmable controller 501 to receive system inputs from the force sensors 505 and to drive feedback devices, such as haptic devices 506, LEDs 507, 508 and speaker(s) 509. Controller 501 is powered by power source 502, which can be a power source specific to glove system 500 or can be a general power source for the astronaut and spacesuit. Controller 501 receives inputs from each force sensor 505 and provides signals to each feedback devices using wiring harnesses 512 and 514 for glove feedback devices and helmet feedback devices respectively. The controller 501 preferably tracks the input from each force sensor separately so that the controller can provide feedback specific to each controller. The input is also preferably relative to the size of the force sensed so that the controller can provide proportional or relative feedback if programmed to do so, though the system can work simply by receiving a signal indicative of a preset threshold being exceeded.

After receiving a signal from a force sensor 505 that the controller is programmed to provide feedback for, the controller is then operable to send a drive signal to the appropriate feedback device. The signal may be a single type of signal or may be a signal proportional to the force detected. The signal from the controller may also include the power to drive the feedback device as required.

As discussed above, different types of feedback devices are contemplated by the present invention and those devices can be incorporated into any appropriate piece of the astronaut's equipment, such as the glove 503 or helmet 510. Glove 503, for example may include haptic devices 506 to provide general feedback, or the haptic devices may be associated with a particular sensor to provide feedback localized to the area where the associated force is being sensed. In preferred embodiments, haptic devices 506 can be incorporated into the glove finger 504 adjacent to the associate force sensors. Haptic devices can also be incorporated into the palm, knuckles or other areas of interest in the glove. The haptic devices 506 should be incorporated into the glove structure in a location that provides enough tactile feedback to the astronaut to be useful.

In addition to, or instead of, haptic devices, embodiments of glove 503 may include visual feedback devices such as LEDs 507. LEDs 507 are preferably on the back of glove 503 and within the astronaut's visual field when the astronaut is working. The visual feedback may be a single LED in the back of the glove to indicate excessive force at a single sensor or there may be an LED associated with each sensor, such as an LED placed on the back of each finger 504. Relative force may be indicated by increasing the brightness of the LED as force increases or an LED array may be used such that more individual LEDs light up as force increases. Other visual feedback devices of the same function can be used in place of the LEDs.

Helmet 510 may also include feedback devices. While haptic feedback could be included in the helmet 510, visual or auditory feedback is preferred. Visual feedback can be provided by a light 508 in the visual field of the helmet or could trigger a warning in a heads-up display (HUD) function of the helmet. Other visual feedback mechanisms using existing systems in the helmet 510 are also well within the scope of the present invention. Auditory feedback can be provided using speaker 509 in helmet 510. Speaker 509 is preferably implemented using the existing auditory system of helmet 510 but could also be an application specific speaker if required.

Figure 6:
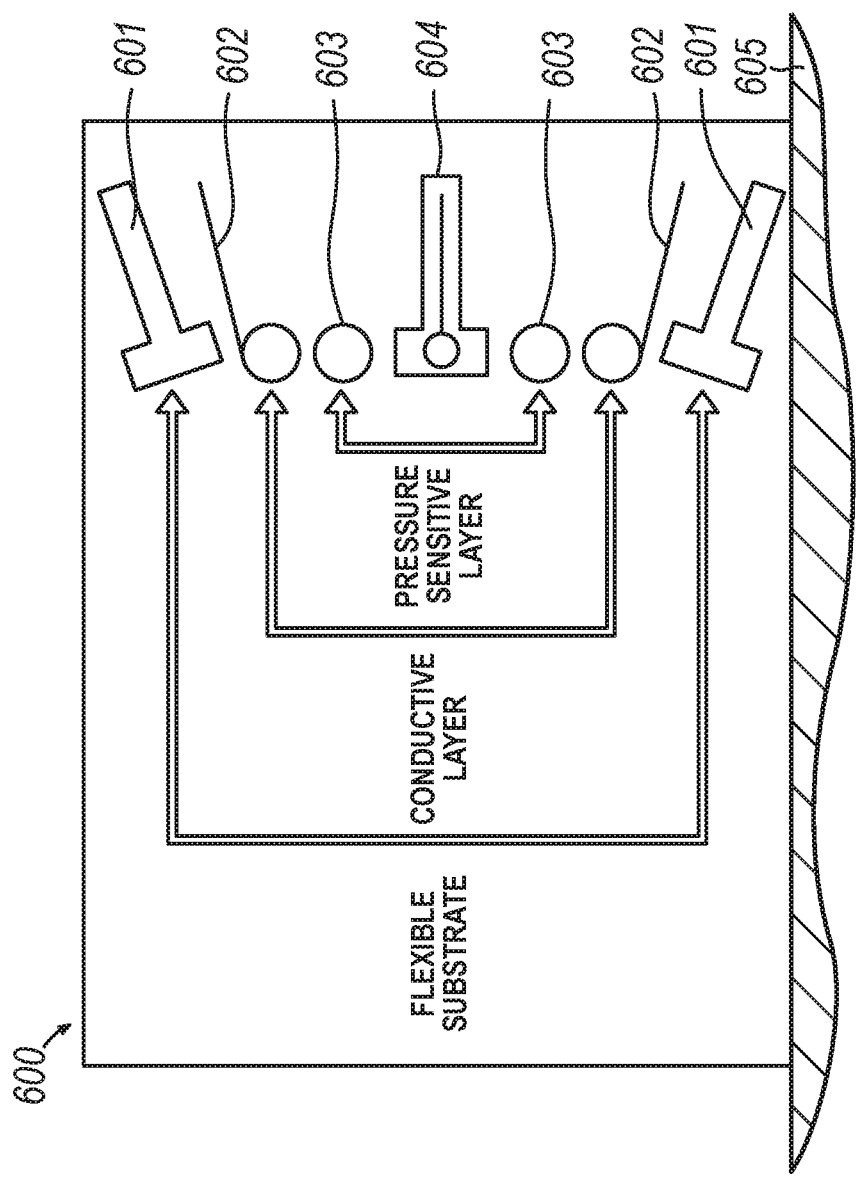
FIG. 6 is a diagram of an embodiment of a force sensitive resistor for use in the present invention.

Referring now to FIG. 6, an embodiment of a force sensor appropriate for the glove system of the present invention is shown. The invention preferably operates with a plurality of force sensitive resistors 600 and a plurality of linear resonant actuators (see FIG. 7) placed on each fingertip. Force sensor 600 may be constructed of a pressure sensitive layer 603 on either side of an adhesive layer 604. Conductive layer 602 surrounds pressure sensitive layer 603 and conducts the electrical signal indicating the force sensed by pressure sensitive layer 603. Flexible substrate 601 surrounds and insulates conductive layer 602. Resistor 600 is mounted on one side to glove layer 605.

When external force is applied to the force sensitive resistor 600, the conductive film 603 of the resistor is deformed against the substrate 601. Air or another insulator is displaced, and the conductive film comes into contact with conductive print on the substrate. The more of the conductive layer that touches the conductive film, the lower the resistance. The magnitude of the resistance is therefore proportional to the amount of force exerted. As described, the force sensitive resistors 600 may be placed on the inside of each digit of the thermal micro-meteoroid garment, or outer layer of glove 605, to allow each unit to sense the force applied more easily.

Figure 7:
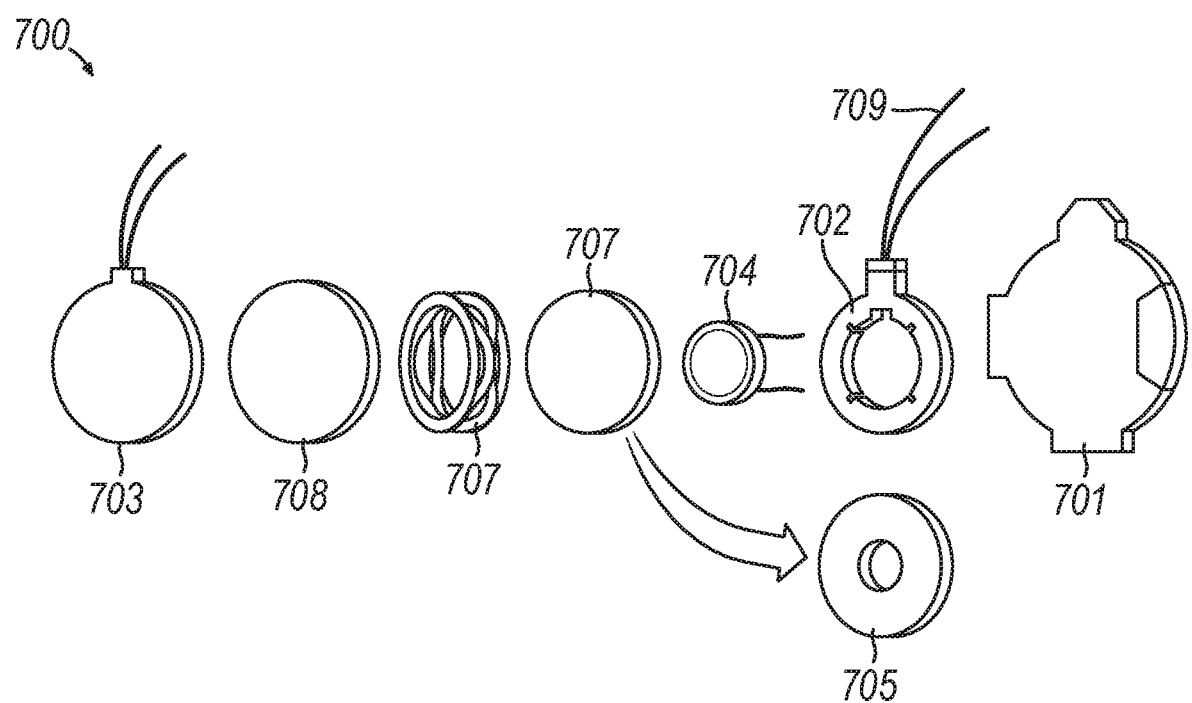
FIG. 7 is a diagram of an embodiment of a haptic feedback device for use in the present invention.

Referring now to FIG. 7, a diagram of an exemplary individual linear resonant actuator that can be used as a haptic device is shown. Linear resonant actuator 700 is a vibration motor comprised of a coil 704, mass 706, and spring 707. Coil 704 is mounted in frame 705 while frame 705, mass 706 and spring 707 are mounted in motor chassis 701 along with pcb 702 and board 703. Motor cover 708 seals the assembly in motor chassis 701. When a signal current is applied to leads 709, the current flows through coil 704 creating a magnetic field that causes mass 706 to push against spring 707. Changes in the current produce changes in the magnetic field acting on mass 706. These changes along with the force applied by spring cause the mass to vibrate according to the supplied input signal. The vibrating mass produces a tactile force that can be felt by a user in contact with the device 700. As described, the linear resonant actuators 700 may be placed on the outside of each digit of the bladder, or innermost layer of the glove 433, to allow each unit to provide perceivable tactile feedback to the wearer.

As described, the haptic devices 700 are connected to the controller and receive information from the controller to vibrate when the controller receives a force detected by the force sensor within a programmed range. While a linear resonant actuator is shown, any other haptic sensor can be used in place of the linear actuator of FIG. 7, as required for other applications.

Figure 8:
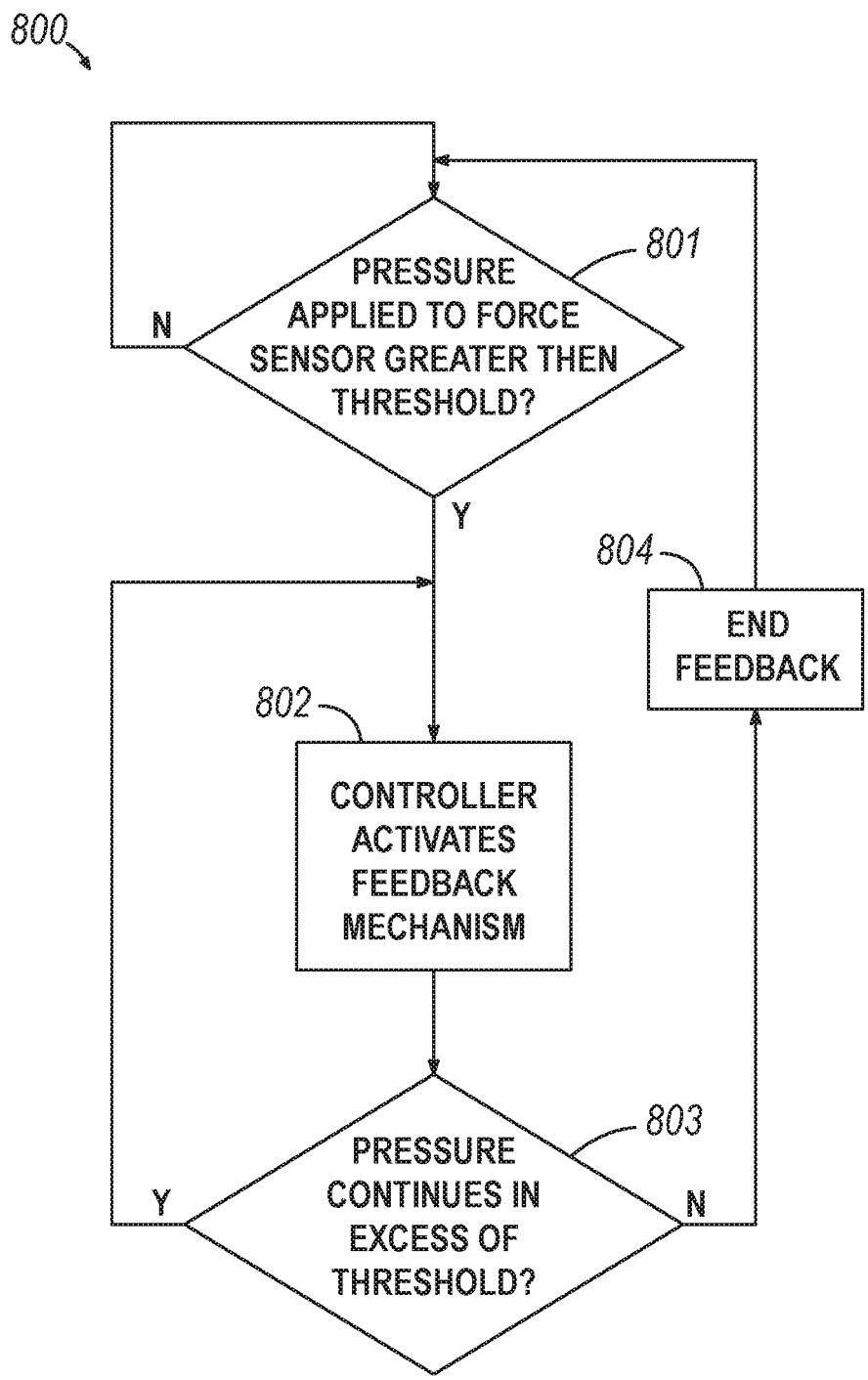
FIG. 8 is flow diagram of an embodiment of a haptic feedback loop according to the concepts described herein.

Referring now to FIG. 8, an embodiment of a method of providing tactile feedback in a glove is shown. Method 800 is an embodiment of a threshold driven program for providing tactile feedback when a detected force exceeds a predetermined threshold. Method 800 begins with step 801 where a determination is made if a pressure applied to a force sensor is greater than a preprogrammed threshold, such as twenty megapascals. If the force applied is not greater, the method returns to step 801. If the force applied is greater than the threshold then the method proceeds to step 802 where the controller activates the feedback mechanism to provide the user with an indication that they are providing excessive force with one or more fingers or other pressure points. The feedback may be general or specific to the individual pressure point such as a fingertip. Next, in step 803, the method determines if the pressure remains in excess of the threshold. If yes, the method returns to step 802 and continues to provide feedback. If not, the method moves to step 804 where the feedback is stopped before then moving back to step 801.

Figure 9:
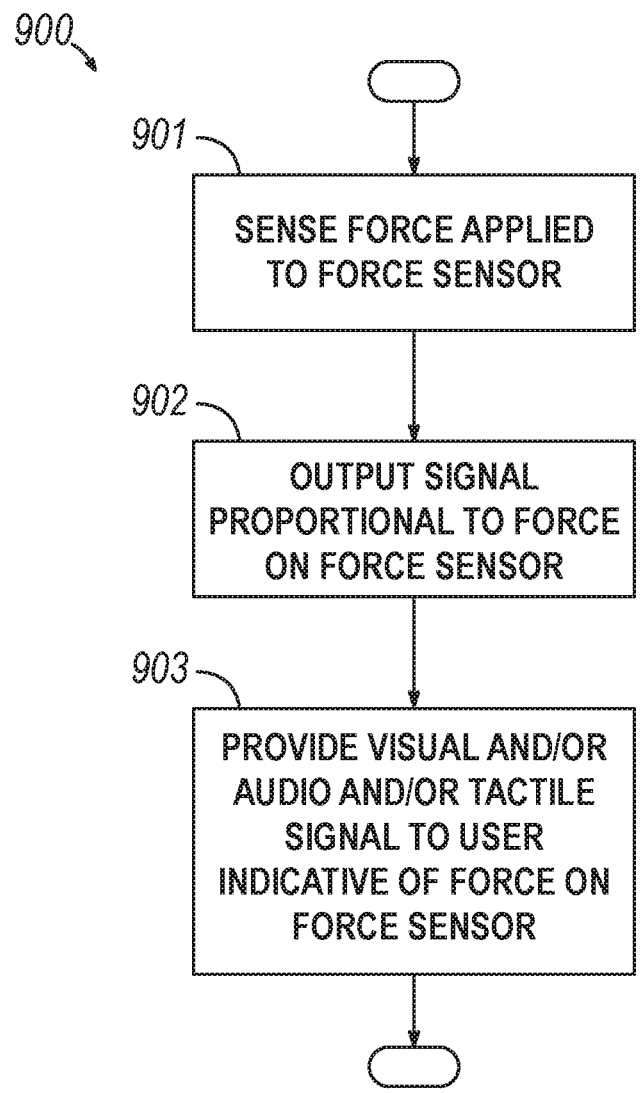
FIG. 9 is a flow diagram of an alternate embodiment of a haptic feedback loop according to the concepts described herein.

Referring now to FIG. 9, an embodiment of a method for providing proportional tactile feedback in a glove is shown. Method 900 begins in step 901 where the force applied to a force sensor is detected. Step 902 then generates a signal proportional to the force on the force sensor, and finally, step 903 provides a feedback signal to the user that is proportional and indicative of the amount of force detected at the sensor.

While the present invention has been discussed with reference to an EVA glove system for use by astronauts, where the glove wearer is not subject to the vacuum of space, the protective layers that EVA gloves provide is not needed. Other applications for a glove having only one or two layers according to the concepts described herein can be imagined and are well within the scope of the present invention. In these alternate embodiments, a glove of any suitable materials for the specific occasion can be used. For example, in one embodiment, a version of this sample glove may be used by museum curators while handling fragile equipment in the workplace. In this situation, the concern does not deal with finger trauma, but rather is the concern of damaging priceless artifacts. Because this purpose does not deal with the survival of humans in harsh environments, the thick and protective layers of an EVA glove are not needed in a controlled Earth environment. For these much thinner working gloves, linear resonant actuators can be embedded into the fingertip itself, while the force sensitive resistors can be placed on the outside of the glove. Additionally, the amount of force applied to break artifacts is far less than that needed to cause finger trauma. For this reason, a smaller threshold may be used in this situation.

Figure 10A:
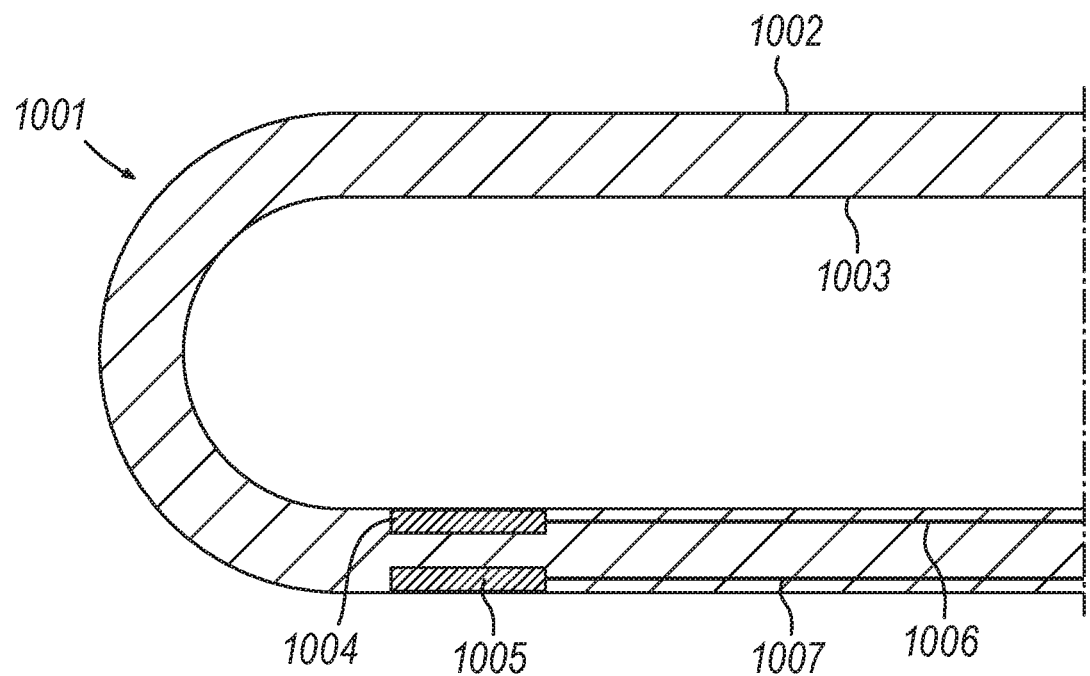
FIGS. 10A and 10B are cutaway side views of alternate embodiments of glove systems using two-layer and one-layer gloves according to the concepts described herein.

Referring now to FIG. 10A, an embodiment of a finger for a two-layer glove incorporating the concepts of the present invention is shown. Two-layer glove 1001 includes an inner glove 1002 and an outer glove 1003. Force sensor 1005 may be applied to either surface of the outer glove 1002 while haptic device 1004 is applied to either surface of the inner glove 1003. Wires 1006 and 1007 may be adhered to or incorporated into the glove materials and provide signals to and from haptic device 1004 and force sensor 1005, respectively. While a haptic device at a fingertip of glove 1001 is shown, other feedback mechanisms may be incorporated into glove 1001 as described above.

Figure 10B:
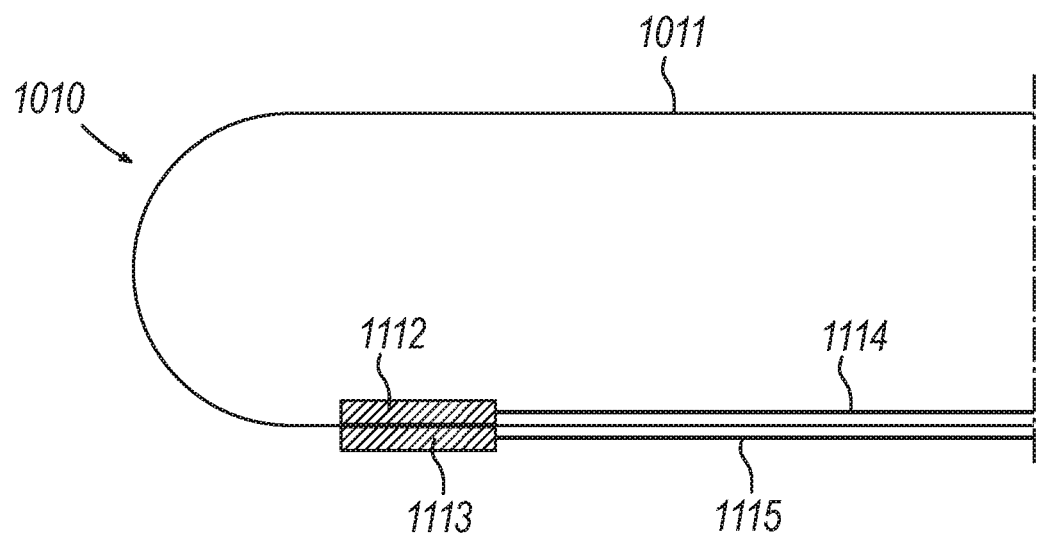

Referring now to FIG. 10B, an embodiment of a finger for a single-layer glove incorporating the concepts of the present invention is shown. Glove 1010 is formed by material 1011. Force sensor 1113 may be applied to an outer surface of the glove 1010 while haptic device 1114 is applied to an inner surface of the glove 1010. Wires 1114 and 1115 may be adhered to or incorporated into the glove materials and provide signals to and from haptic device 1112 and force sensor 1113, respectively. Again, while a haptic device at a fingertip of glove 1001 is shown, other feedback mechanisms may be incorporated into glove 1001 as described above and embodiments of the single-layer glove may place both the force sensor and haptic device on the outside of glove material 1011 or the inside of glove material 1011, as appropriate for the application and operation of the tactile feedback glove.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A tactile feedback glove comprising:
an outer layer of a material;

a second layer of a second material inside the outer layer;

a bladder formed from a gas impervious material inside the second layer, wherein the outer layer, the second layer and the bladder form a glove;

at least one force sensor attached to an inner surface of the outer layer of the glove at a point of interest on the glove;

at least one haptic feedback device attached to an outer surface of the bladder adjacent to the corresponding force sensor and positioned to provide tactile feedback to a wearer of the glove in response to a force sensed at the corresponding force sensor;

at least one visual feedback device attached to the glove material at a location on a back side of the glove within a normal field of view of the wearer to provide visual feedback to the wearer of the glove corresponding to the tactile feedback from the at least one haptic feedback device; and a controller electrically connected to the at least one force sensor, the at least one haptic feedback device and the visual feedback device, the controller receiving a signal from the at least one force sensor indicative of the force applied by the wearer at the point of interest, the controller further sending a feedback signal to drive the at least one haptic feedback device and visual feedback device to provide tactile and visual feedback to the wearer when the signal from the force sensor meets preprogrammed levels.

2. The tactile feedback glove of claim 1, wherein the glove includes force sensors and haptic feedback devices at each fingertip.

3. The tactile feedback glove of claim 2, wherein controller sends the feedback signal to the haptic feedback device on a same fingertip as the force sensor from which the signal was received.

4. The tactile feedback glove of claim 1, wherein the visual feedback device is an LED.

5. The tactile feedback glove of claim 1, wherein the feedback signal is sent when the signal from the at least one force sensor exceeds a threshold.

6. The tactile feedback glove of claim 1, wherein the feedback signal is proportional to the signal from the force sensor.

7. The tactile feedback glove of claim 1, wherein the outer layer is formed from multiple layers which include Nomex and RTV.

8. The tactile feedback glove of claim 7, wherein the outer layer is formed from multiple layers which include Dacron and Kevlar.

9. The tactile feedback glove of claim 7, wherein the bladder is formed from Rucothane.

10. The tactile feedback glove of claim 1 further comprising an auditory feedback device.

11. A tactile feedback glove for use in an extravehicular activity (EVA) environment by an astronaut comprising:

a glove formed by an outer layer, a second layer and inner bladder, wherein the inner bladder encloses a gas environment suitable for an astronaut's hand, the glove having fingers for each of the astronaut's fingers;

a force sensor attached to a fingertip of each finger of the glove on an inner surface of the outer layer, wherein each force sensor senses the pressure applied at the associated fingertip;

a haptic feedback device attached to the fingertip of each finger of the glove on an outer surface of the inner bladder, wherein each haptic feedback device is adjacent to each associated force sensor and positioned to provide tactile feedback for the associated finger;

a visual feedback device attached to an outer surface of the outer layer of each finger of the glove in a visual field of the astronaut and associated with a corresponding haptic feedback device, the visual feedback device to provide visual feedback to the wearer of the glove corresponding to the tactile feedback from the associated haptic feedback device; and a controller electrically connected to each force sensor, each haptic feedback device and the visual feedback device, the controller receiving a signal from each force sensor indicative of the force applied by the wearer the associated fingertip, the controller further sending a feedback signal to drive each haptic feedback device and visual feedback device to provide tactile and visual feedback to the wearer when the signal from one of the force sensors meets preprogrammed levels.

12. The tactile feedback glove of claim 11, wherein the glove further comprises a palm mounted force sensor and a palm mounted haptic feedback device.

13. The tactile feedback glove of claim 11, wherein the haptic feedback device is a linear resonant actuator.

14. The tactile feedback glove of claim 11, wherein the visual feedback device is an LED.

15. The tactile feedback glove of claim 11, wherein the feedback signal is sent when the signal from the at least one force sensor exceeds a threshold.

16. The tactile feedback glove of claim 11, wherein the feedback signal is proportional to the signal from the force sensor.

17. The tactile feedback glove of claim 11, further comprising a visual feedback device associated with each force sensor.

18. A method for providing tactile feedback in a glove comprising:

generating a signal representing the force generated at a point of interest on the glove using at least one force sensor attached to the glove at the point of interest, wherein the glove is formed from an outer layer, a second layer and a bladder and the force sensor is attached to an inner surface of the outer layer;

providing a feedback signal to a haptic feedback device attached to an outer surface of the bladder adjacent to the force sensor and positioned to provide tactile feedback to a wearer of the glove, the feedback signal based on the signal from the force sensor; and providing visual feedback based on the feedback signal using a visual feedback device attached to the glove material at a location on a back side of the glove within a normal field of view of the wearer based on the signal from the force sensor.

19. The method of claim 18, wherein the glove includes force sensors and haptic feedback devices at each fingertip.

20. The method of claim 19, wherein controller sends the feedback signal to the haptic feedback device on a same fingertip as the force sensor from which the signal was received.

* * * * *